July 10, 1962  S. B. JONES ETAL  3,044,010
FORMATION LIQUID LOGGING
Filed Aug. 29, 1955  2 Sheets-Sheet 1

INVENTORS
STANLEY B. JONES
ROBERT J. S. BROWN
BY
ATTORNEYS

July 10, 1962  S. B. JONES ETAL  3,044,010
FORMATION LIQUID LOGGING
Filed Aug. 29, 1955  2 Sheets-Sheet 2

INVENTORS
STANLEY B. JONES
ROBERT J. S. BROWN
BY
ATTORNEYS

United States Patent Office 3,044,010
Patented July 10, 1962

3,044,010
FORMATION LIQUID LOGGING
Stanley B. Jones, Whittier, and Robert J. S. Brown, Fullerton, Calif., assignors to California Research Corporation, San Francisco, Calif., a corporation of Delaware
Filed Aug. 29, 1955, Ser. No. 531,243
5 Claims. (Cl. 324—.5)

The present invention relates to a method of logging the liquid content of earth formations traversed by a well bore, more particularly to a method of logging the total liquid content of earth formations by inducing a nuclear magnetic field in the earth formations to measure the density of the responsive protons in the formations.

The invention has for an object the provision of a method of determining the total liquid content in earth formations traversed by a well bore, independently of the shape and size of the bore hole, by determining the density of responsive protons in the drilling fluid utilized in said well bore, and then determining separately the amplitudes of nuclear magnetic signals from both the drilling fluid in the bore hole and the liquids in the formation, to determine the density of responsive protons in the formation as a direct measurement of the liquid content of said formation.

The term, density of responsive protons, as used herein refers to the number of protons per unit volume in the material being investigated, and more exactly to the number of protons, or hydrogen nuclei, per unit volume, that are free to react to imposed magnetic fields so as to give useful nuclear magnetic signals. Ordinarily, all protons contained in the molecules of fluids are such responsive protons. The word "responsive" is used here specifically to exclude those protons that are bound into molecules of solid materials, or into molecules of ordinarily fluid materials that themselves are bound or adsorbed into or onto solid materials by strong physical or chemical forces so that their protons cannot freely orient themselves in imposed magnetic fields and cannot respond to those fields in such a manner as to give useful nuclear magnetic signals.

The fluids that occur in earth formations, with which this invention is concerned, are petroleum oils, petroleum gases, and water. It happens, as a phenomenon of nature, that the number of protons per unit liquid volume of liquid petroleum oils, and the number of protons per unit liquid volume of liquid water are approximately equal, so that for the purposes contemplated by this invention, they may usually be considered equal.

The number of protons per unit volume of petroleum gas is usually much less than in oils or water; for example, it may be a thousand times smaller. It follows from these facts that if the density of responsive protons is determined in a portion of space, which space is filled with a porous rock, whose pores in turn are filled with oil, gas, and water, the determined density of responsive protons will be essentially a measure of the total liquid content of the pores of said rock. Furthermore, if the rock pore spaces happen to be full of only oil and water, with no gas, the determined density of responsive protons will be a measure not only of the total liquid content of the rock but also a measure of the amount of pore space in the rock, or what is called in the art, the porosity of the rock.

It has long been desired to be able to measure the porosity of earth formations traversed by a well bore, and various well logging methods have been in use to measure physical quantities, for instance, electrical characteristics of the earth formations, from which by indirect assumptions and computations, the porosity of the formations may be deduced. After the porosity is deduced, it is desirable to deduce by other indirect assumptions and computations the liquid content of the pore spaces. For instance, the water content of the pore spaces may be deduced in the art of electric log interpretation by a computation method known as the Archie method. However, the invention described herein makes possible the direct, rather than the indirect, determination of the total liquid content of the rock.

The method of the present invention is concerned with an improvement on the method of nuclear magnetic logging described in a copending application, Serial No. 337,384, filed February 17, 1953, in the names of Baker, Johnes, and Seevers, the second-named inventor being a coinventor of the present invention. As described in that application, a strong magnetic field is applied to the material within and surrounding a well bore. The strong field is then very rapidly removed. Protons in the material within and surrounding the well bore are thereby caused to precess in the remaining earth's magnetic field. A magnetic signal is generated by said precessing protons, and said signal is detected by a coil and suitable amplifying means. This signal is usually described in terms of one or more of its characteristics, some of which are: frequency, relaxation time, and amplitude.

The frequency is related to properties of the protons themselves and to the strength of the magnetic field in which the protons are precessing. In well logging, the frequency will usually be of the order of 2,000 cycles per second. The exact value of the frequency will be a measure of the earth's magnetic field at the depth in the earth at which the logging is taking place, and consequently, determination of the exact value of the frequency is useful when the magnetic properties of the earth formations are in question, but those particular properties are not of chief concern in the method of the present invention, and so the frequency of the nuclear signal is not of chief concern here.

The relaxation time is usually defined as the time taken by the signal to decay in amplitude from its initial value to a value equal to $1/e$ times that initial value, where $e$ is the natural logarithmic base.

In copending application Serial No. 337,384, description is given of the use of relaxation times to distinguish nuclear magnetic signals from oil and water. In the present invention such use is not contemplated as the primary aspect of the method. It is necessary, however, that there be two distinguishable relaxation times, one being that of the fluid in the bore hole and the other being that of the fluid in the formation surrounding the bore hole. It is necessary that these two relaxation times be different enough to permit separate measurement of the amplitudes of the respective signals, but as long as they are different enough there is no primary need to measure the relaxation times themselves quantitatively. However, under certain conditions the present method may be used in conjunction with relaxation time measurements to distinguish additionally between oil and water.

In accordance with a preferred method of carrying out the invention, the total liquid content of the earth formations is determined by first measuring the density of the responsive protons in the drilling fluid, independently of the well bore, by producing within a known volume, of known shape, of said fluid a nuclear magnetic signal and measuring the amplitude of the signal from said responsive protons, and thereafter measuring adjacent the earth formation whose liquid content is to be determined the separate amplitudes of nuclear magnetic signals from the fluid in the bore hole and from the liquids in the formation surrounding the bore hole. The invention comprises carrying out these measurements in such a manner that the final result, the density of responsive protons in the formation, is determined quantitatively, exact compensations having been made for all variations of shape and size of the bore hole.

Further, in accordance with the method of the present invention, there is provided a method of altering, when desired, the relaxation time of the responsive protons within the drilling fluid, by the introduction of a magnetic material that exhibits paramagnetic, or ferromagnetic, properties to shorten the relaxation time of the protons in the drilling fluid. Accordingly, there is provided by the present invention a system for determining directly the porosity and fluid content of the earth formation.

Further objects and advantages of the present invention will become apparent from the following detailed description taken in conjunction with the accompanying drawings which form an integral part of the specification.

Figure 2A:
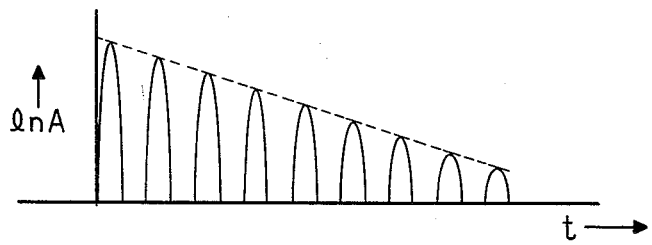
FIG. 2A is a diagrammatic representation of the type of nuclear magnetic relaxation time signal obtained when a strong polarizing magnetic field, applied to a body of fluid, is suddenly removed and the protons of the fluid are allowed to precess in the earth's magnetic field.
Figure 2B:
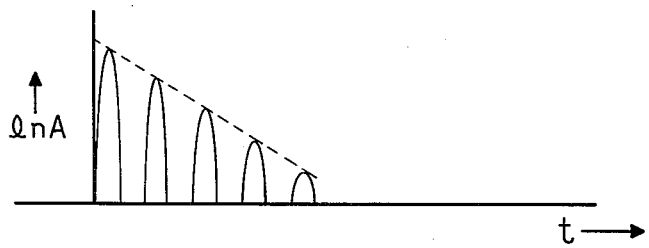
FIG. 2B is similar to FIG. 2A, but represents a fluid having a different relaxation time.
Figure 3:
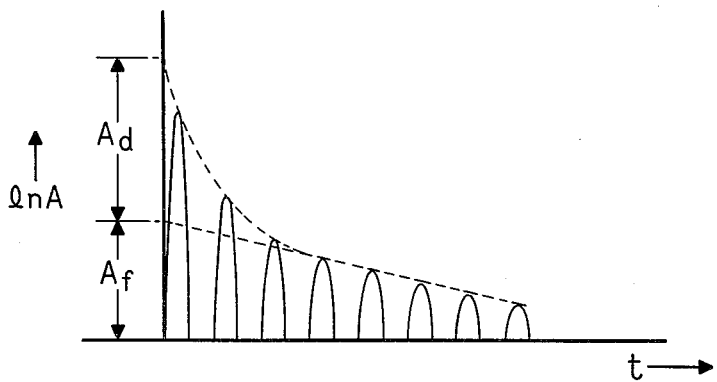
FIG. 3 is a diagramatic representation of a modified nuclear magnetism signal obtained in accordance with the present invention when two different fluids, such as the drilling fluid in the bore hole, and the fluids of a formation, have sufficiently different relaxation times to permit separate identification of the amplitude contribution of the formation fluid, and also that of the drilling fluid.

It will be noted that each of the FIGS. 2A, 2B, and 3 is semi-logarithmic. The ordinates represent logarithms of signal amplitudes and the abscissas represent time on arithmetic scale.

Figure 1:
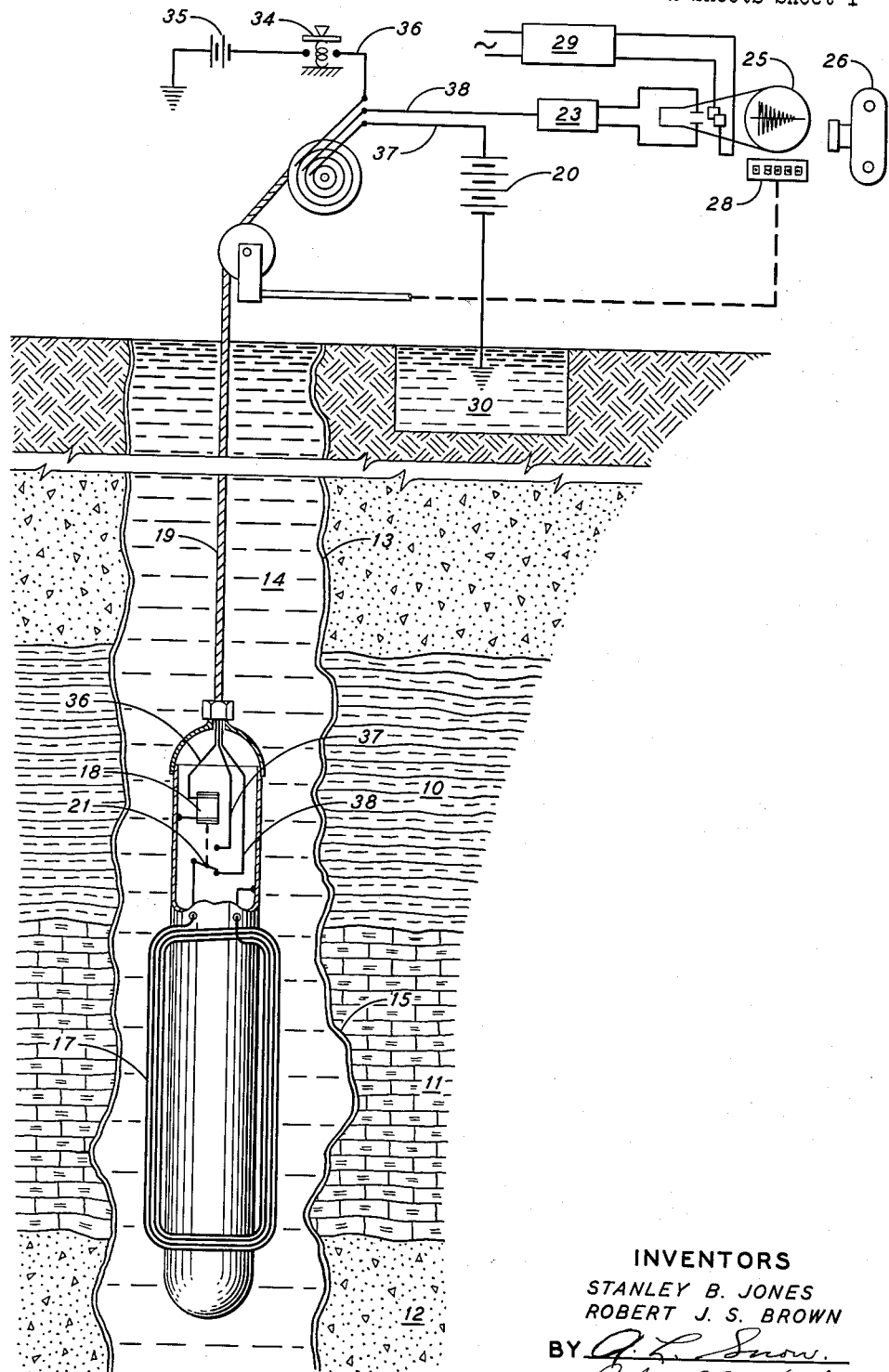
FIG. 1 is a schematic representation of a well bore illustrating a portion of the apparatus utilized in performing the method of the present invention to determine porosity and fluid content of earth formations, independently of the shape and size of the bore hole passing therethrough.

As illustrated in FIG. 1, the present method is directed to a system for determining liquid content or the porosity of earth formations such as those identified as 10, 11, and 12, traversed by well bore 13. Bore hole 13, illustrated as being a well bore penetrating earth formations in search of oil, has been depicted as having irregular shape and irregular dimensions; it is filled with a drilling fluid 14 which forms a filter cake 15 along the surface of the bore hole through which some of the liquid phase of the drilling fluid may penetrate formations 10, 11, and 12.

As further shown in FIG. 1, the logging instrument is in a position to measure the density of responsive protons in the formation 11, the polarizing coil 17 being opposite formation 11. A strong direct current is passed through coil 17 for a period sufficient to induce a macroscopic nuclear magnetic moment in the responsive protons belonging both to the drilling fluid and the formation fluid. Power is supplied to coil 17 from source 20 through lead 37 of cable 19. Then, the direct current is stopped very suddenly, as described in the aforementioned Baker, Jones, and Seevers application Serial No. 337,384.

The direct current supplied by source 20 to coil 17 is suddenly stopped through operation of switch 21 by relay 18. Subsequently, the protons in the formation and in the drilling fluid will precess in the earth's magnetic field, and their precession may be detected through the oscillating magnetic signal that their motion produces in coil 17. By connecting coil 17 through switch 21 and cable lead 38 to a receiving and translating circuit 23, as shown, coil 17 is converted from a field generating device to a field measuring device. This conversion is made when relay 18 operates in response to push button 34 to control the power supplied by battery 35 to cable lead 36. The output of translating circuit 23 may be applied to a cathode ray tube 25, whose output is in turn recorded progressively and continuously by any suitable means such as camera 26.

Camera 26 may also be made to record simltaneously the depth of coil 17 in the well bore by photographing a depth indicator 28, which is responsive to the length of cable 19 in the well bore. The signal observed on cathode ray tube 25 may be made semilogarithmic, as represented in FIG. 3, by suitable circuitry in the translating circuit 23. It is to be specifically noted, however, that the logarithmic representation of the signal is a mere convenience for some kinds of logging operations. It is mentioned here for convenience and simplicity in the description of the logging process in question, but the logarithmic representation of the signal is not essential to the method and the method could be made to operate, for instance, if the signal representation were purely arithmetic.

By whatever detailed method the oscillatory signal is obtained, it should be either in a form such as that represented in FIG. 3, or an equivalent form that makes it possible to see separately the contribution to the signal from the drilling fluid, and the contribution from the fluids in the formation. If the composite signal is represented semi-logarithmically, as in FIG. 3, and if the relaxation times of the component signals are sufficiently different, it is possible to extrapolate the envelope of the formation-component back to the amplitude axis to estimate the initial value of the amplitude of the signal, $A_f$, from the formation fluids, as shown in FIG. 3. This amplitude, $A_f$, may be subtracted from the total amplitude, which is estimated by extrapolating the envelope of the total signal back to the amplitude axis. The difference between the total amplitude and the amplitude $A_f$ is the amplitude of the signal from the drilling fluid, designated in FIG. 3 as $A_d$. It is understood that both of the amplitudes $A_f$ and $A_d$ may be converted into numbers representing the actual, arithmetic magnitudes, not the logarithms of those magnitudes. If the semilogarithmic scale is not marked off in arithmetic numbers, a conversion may be made. The final numbers to be used in estimating liquid content or porosity are usually arithmetic.

If the fluids in the formation are not sufficiently unlike the drilling fluid, it may happen that the drilling fluid will need to be modified, in order to change the relaxation time of the protons in the drilling fluid, so that a composite signal like that of FIGURE 3 will be obtained, in which the contributions of the drilling fluid and of the formation fluid are distinguishable. If such a need exists, the relaxation time of the responsive protons in the drilling fluid may be shortened by the introduction of one or more magnetic materials that exhibit paramagnetic or ferromagnetic properties.

In general, said magnetic materials will be specifically added to the drilling fluid at a desired time, either during the drilling operations, or after such operations are completed.

In order that the quantities, $A_d$, the amplitude of the signal from the drilling fluid, and $A_f$ the amplitude of the signal from the formation fluids, may be used to determine the density of responsive protons in the formation, it is necessary that two other quantities be known. One of these is an instrument constant, C, the determination of which amounts to a calibration of the logging instrument. The other is the density of responsive protons in the drilling fluid, $P_d$. Methods by which these two quantities may be determined will now be described. It will be appreciated that the definitions of these quantities are somewhat arbitrary and that the specific methods used for their determination should depend on the specific definitions chosen.

It is convenient to define the instrument constant C as the amplitude of the signal that would be obtained if the instrument were immersed in an infinite body of liquid having unit density of responsive protons. It is convenient also to define unit density of responsive protons as that density possessed by magnetically uncontaminated water. So, a convenient specific definition of the instrument constant C is the amplitude of the signal that would be obtained if the instrument were immersed in an infinite body of magnetically uncontaminated water, such as distilled water at standard pressure and temperature, or $C = A_f$ (std.). This instrument constant may, of course, be determined during immersion of the instrument in a large, nonmagnetic vessel of water, the diameter of the vessel being many times the diameter of the instrument. The signal obtained in such a vessel will be approximately equal to the signal that would be obtained in an infinitely large vessel because the contribution to the signal of the water far away from the instrument in an infinite vessel would be negligible; all the significant part of the signal would come only from the water within a distance equal to a few diameters of the logging instrument.

After an instrument constant, C, is determined, the density of responsive protons in the drilling fluid, $P_d$, is determined by immersion of the instrument in the drilling fluid. This measurement also may be made in a large, effectively infinite, vessel, or it may be made in a smaller vessel, calibrated by a direct comparison between the signal intensities obtained with the instrument in said smaller vessel and the instrument in an infinite medium. If the measurement is made in an effectively infinite vessel, and if unit density of protons is defined as above, the density of responsive protons in the drilling fluid, $P_d$, will simply equal the ratio of the obtained signal $A_d$ (std.) to the instrument constant, C, or $$P_d = \frac{A_d(\text{std.})}{C} = \frac{A_d(\text{std.})}{A_f(\text{std.})}$$

Now the necessary quantities have been defined to permit an explanation of the theory of the determination of the density of responsive protons in a formation penetrated by an irregularly shaped bore hole, which theory forms the basis of the steps involved in carrying out the method of the present invention which permits the making of said determination.

The theory that underlies the method of the present invention can be summarized in a few, simple, mathematical equations. Indeed, they are so simple that their very simplicity is deceptive unless their meaning is fully studied.

The basis of the theory is the physical fact that in the nuclear magnetic logging process each portion of material in the region surrounding the logging sonde gives rise to its own portion of the nuclear magnetic signal, and the individual portions of the signal are merely summed up by the logging instrument, that is, added algebraically; but otherwise the individual signals have no effect on each other. If it is not immediately evident that this is a remarkable characteristic of the nuclear magnetic logging process, let brief consideration be given to any other known logging process, for instance, the electric logging process. In electric logging, the portion of the signal that is received from a part of the formation, say two feet away from the logging sonde, is modified by all of the formation within two feet of the sonde, because the signal is sensed by the sonde only through and because of the passage of electric currents between the part of the formation in question and the sonde, and those currents are modified by the electrical properties of all intervening material.

On the other hand, in the nuclear magnetic logging process, the magnetic signal from a distant part of the formation is attenuated primarily by geometric effects having to do with distance and shape, and for practical purposes it is not affected by what materials exist in the intervening space. The only effect neglected in this consideration is that due to eddy currents generated when the polarizing coil is switched off and those generated by nuclear precession. The effects of such eddy currents originating in either manner are negligible in the practical measurement.

The above physical fact about nuclear magnetic logging can be expressed in a simple equation for the total amplitude of signal detected by a nuclear magnetic logging sonde. If this total amplitude is A, and the density of responsive protons in a volume element $dV$ is P, then $$A = \int_{\text{vol.}} PG \, dV \tag{1}$$

where the volume integral is taken over the entire volume surrounding the sonde, or for all practical purposes, merely over a volume whose diameter is of the order of 10 sonde diameters, because the remaining volume outside that volume contributes inappreciably to the signal. Equation 1 contains a quantity G which is a geometric factor associated with each volume element $dV$, and which specifies the diminution of contribution to the total signal that is the result of mere geometric distance.

Now, if the entire region around the logging sonde is actually divided into two distinct regions, such as a borehole and a surrounding formation, Equation 1 can be split into two terms as follows:

$$A = \int_{\text{vol. 1}} PG \, dV + \int_{\text{vol. 2}} PG \, dV \tag{2}$$

Furthermore, if it can be assumed, for practical purposes, that in each of these two regions, the density of responsive protons is substantially uniform, although it is different in regions 1 and 2, then Equation 2 may be simplified by placing the substantially constant proton densities outside of their respective integrals, as follows:

$$A = P_1 \int_{\text{vol. 1}} G \, dV + P_2 \int_{\text{vol. 2}} G \, dV \tag{3}$$

If this is done, it then becomes apparent that the quantities left under the integral signs, the geometric factors, themselves integrate into quantities that are, in turn, still other mere geometric factors, $G_1$ and $G_2$, characteristic of the shapes of regions 1 and 2:

$$A = P_1 G_1 + P_2 G_2 \tag{4}$$

Now from the definition of the instrument constant C, which is the amplitude of the signal that would be obtained if the logging sonde were immersed in an infinite body of unit responsive proton density (e.g. water), it is apparent that the two geometric factors, $G_1$ and $G_2$ must sum to equal the instrument constant, because the amplitude of the signal obtained from such an infinite medium would be, from Equation 4:

$$A = (1)G_1 + (1)G_2 = G_1 + G_2 = C \tag{5}$$

In the special case under consideration here, the two regions of interest are the drilling fluid region, which may be characterized by the geometric factor $G_d$ and the formation region, which may be characterized by the geometric factor, $G_f$; and in accordance with the definitions given hereinbefore, the amplitude of the signal from the drilling fluid region ($d$) must be:

$$A_d = P_d G_d \tag{6}$$

Likewise, the amplitude of the signal from the formation region ($f$) must be $$A_f = P_f G_f \tag{7}$$

But from Equation 5:

$$G_d + G_f = C \tag{8}$$

Equations 6, 7, and 8 are three equations in the three unknowns, $G_d$, $G_f$, and $P_f$, the other quantities being known by measurements made as described hereinbefore. It is simple to eliminate two of the three unknowns, $G_d$ and $G_f$, leaving the remaining unknown $P_f$, expressed in terms of the quantities that are known from the described measurements. The resulting equation is:

$$P_f = \frac{A_f}{C - \frac{A_d}{P_d}} \quad (9)$$

Equation 9 shows that the desired quantity, the density of responsive protons in the formation is equal to the amplitude of the signal from the formation divided by the difference between the instrument constant, C, and the ratio of the amplitude of the signal from the drilling fluid to the density of responsive protons in the drilling fluid. Equation 9 is the final equation showing how the density of responsive protons in the formation is related to and obtained from the other quantities measured in the method of this invention.

Normally, water filtrate from a water base drilling fluid penetrates the porous and permeable earth formations, such as formation 11, along bore hole 13. Under this condition, filter cake 15 deposited on the wall of well bore 13 will contain a greater concentration of the solid material of said drilling fluid 14 than when held in suspension. Where, in accordance with this invention, magnetite, or other solid magnetic or paramagnetic material is added to the drilling fluid to modify the nuclear magnetism signal from the drilling fluid, the initial amplitude of the signal from the freely precessing protons in both the drilling fluid and formation liquids is independent of the concentration of magnetic material. If excessive magnetic material is added to the drilling fluid, it may not be possible to make a proper measurement of the initial amplitude of the signal from the drilling fluid, because the relaxation time must be long as compared to the precessional period to make possible an exact measurement of the signal intensity. Thus, the liquid content, or porosity, of the earth formation is measured independently of the concentration of the magnetic modifying material used in the drilling fluid, provided said material is retained in the solid material of the filter cake, rather than passing into the formation.

It is to be noted that no appreciable signal will be obtained from the filter cake itself, so that its contribution to the signal will be small. Thus, a small error is introduced in the calculated formation porosity, such that it is less than the actual porosity. This error can be neglected in practical logging operations.

If too much magnetic material is added to the drilling fluid, inhomogeneity of the earth's field may result with attendant and undesirable shortening of the relaxation time of the nuclear magnetism signal from the formation. To avoid this field inhomogeneity problem, the bore hole may be drilled with unmodified fluid if necessary, and then the magnetic material may be added to the well bore shortly before the logging run.

The foregoing method of measuring the density of responsive protons in an earth formation may be modified in many of its details. Among such modifications is that of determining the initial amplitude of the nuclear magnetism signal for a standard sample of the drilling fluid, with the temperature or pressure of said sample elevated to conditions comparable to the downhole environment; both temperature and pressure may be raised to simulate such conditions, if desired.

While the method of measuring the density of responsive protons in the drilling fluid per se, as described above, includes detecting the nuclear magnetism signal with the same instrument as that used in the well logging operation, it will be understood that protron density of the drilling fluid alone may be accurately determined with laboratory equipment. Such laboratory instruments will measure the density of responsive protons in a small sample of the drilling fluid. This accurate measurement of drilling-fluid proton density is most useful after the logging sonde has been calibrated, as mentioned hereinabove, for various densities of responsive protons.

As discussed above, calibration of the logging sonde may be made by first introducing the sonde including its polarizing coil into an effectively infinite body of pure water to establish the instrument constant C at the known proton density $P_f$ (std.) of said body. Under this condition, as noted above, $C = A_f$ (std.). Then, to establish the density of responsive protons $P_d$ in the drilling fluid, the polarizing coil is immersed in a similar effectively infinite body of drilling fluid. Alternatively, for convenience the amplitude of the nuclear magnetism signal obtained when the polarizing coil is immersed in a known (not infinite) volume of pure water, $A_f$ (known geometry), may be compared to the amplitude obtained when the coil is immersed in said infinite body. Drilling fluid is then substituted for the pure water in said known volume and the amplitude $A_d$ of the signal measured. Thus, the mathematical relationship as defined above, between the density of responsive protons in pure water under specified conditions and the density of responsive protons in an unknown drilling fluid is established.

It will be apparent that the total liquid content of the earth formation may be computed and logged automatically from the initial signal amplitudes of the nuclear magnetism signal measured in the bore hole for the drilling fluid $A_d$ and for the formation liquids $A_f$. Such automatic computations are of course made in accordance with Equation 9 above by recording $P_f$ as that value is derived from the measured values $A_f$ and $A_d$. In each logging run, the terms C and $P_d$ will be constants for that run as long as the drilling fluid in the well bore is substantially homogeneous. Thus, the total liquid content of the earth formations along the well bore is recorded in accordance with the depth of the instrument in the bore hole. Said amplitudes may also be used to correlate between strata traversed by adjacent well bores.

From the foregoing description, it will be apparent that there is provided by the present invention a method of determining the total liquid content, or porosity, of earth formations traversed by a bore hole that is independent of irregularities in the geometry of the bore hole. Briefly stated, said method includes the steps of independently measuring the density of the responsive protons of the drilling fluid employed in a well bore, followed by measuring and then separately identifying the amplitudes of the signals generated by responsive protons in the drilling fluid and responsive protons in fluids within the adjacent earth formation and then followed by computation of Equation 9 either automatically or manually; said measurements each being made after establishment and interruption of a magnetic field in the respective responsive proton environments. Additionally, said method may include the preliminary step of adding a magnetic or paramagnetic material to the drilling fluid, and thereby permit distinction of the amplitudes of the signal from protons in the drilling fluid and protons in liquid in the formation comprising the combined signal derived from responsive protons in both the drilling fluid and the formation fluids. Total liquid content as determined with a calibrated logger from the amplitudes of the signals from said responsive protons in the formation fluids is then recorded in accordance with the depth of said formation in the bore hole.

While various modifications and changes in the invention will occur to those skilled in the art from the foregoing description, all such modifications and changes falling within the scope of the appended claims are intended to be included therein.

We claim:

1. A method of determining the liquid content of an earth formation traversed by a well bore independently of irregularities in the diameter and shape of said well bore which comprises the steps of measuring the density of responsive protons of the drilling fluid employed in said well bore and independently of said well bore, then inducing a magnetic field in said well bore containing said fluid and the earth formation adjacent thereto whose liquid content is to be determined, interrupting said magnetic field to permit free precession of the responsive protons in both said drilling fluid and the liquid in said earth formation, detecting the total signal amplitude of said protonic precession at a specified time after interruption of said induced field, separately measuring the contribution to said total signal amplitude by protons in both said drilling fluid and in said formation liquids at a time after said induced field was interrupted, and recording the density of responsive protons in said formation liquids as a direct measurement of the liquid content of said formation, said density of responsive protons in said liquids being proportional to the ratio of said measured amplitude of the signal contributed by said formation liquids to said total signal amplitude, to the ratio of said measured amplitude of the signal contributed by said drilling fluid to said total signal to said measured density of responsive protons in said drilling fluid, without introduction of errors by protons in an unknown volume of drilling fluid contributing to said total signal due to said irregularities of the borehole wherein said measurements are made.

2. A method in accordance with claim 1 which includes adding a solid magnetic material to the drilling fluid so that the contribution to the amplitude of the nuclear magnetic precession signal by said drilling fluid is changed to assist detection of the contribution by said formation liquids to the signal amplitude of the total nuclear precession signal.

3. The method of measuring the liquid content or porosity of an earth formation traversed by a borehole containing a drilling fluid including the steps of introducing an electrical coil adapted to traverse the borehole into a body of pure water of substantially infinite extent, inducing a polarizing field in said body of pure water, interrupting said field to permit free precession of the responsive protons in said water, measuring the initially induced signal intensity resulting from said field as a measure of the signal intensity for unit density of responsive protons in a liquid, $A_f$ (std.), then introducing said coil into a calibrated sample volume of the type of drilling fluid used in the portion of said borehole traversing the earth formation whose liquid content is to be measured, inducing a magnetic field in said sample volume, interrupting said field in said sample volume to permit free precession of the responsive protons therein, measuring the induced signal intensity resulting from said induced field, $A_d$ (std.), as a measure of the density of the responsive protons in said drilling fluid, $P_d$, the ratio $$\frac{A_d \text{ (std.)}}{A_f \text{ (std.)}}$$

of intensity of signals from responsive protons in the drilling fluid and unit density as measured in pure water establishing the instrument calibration, C, of said coil in an environment that includes said drilling fluid, then measuring the density of responsive protons in said earth formation, $P_f$, as an indication of its liquid content by inducing a magnetic field in responsive protons in both said drilling fluid within said borehole and the fluids within said earth formation, interrupting said magnetic field to permit said responsive protons to precess in the earth's magnetic field, detecting the signal induced in said coil by the combined precession of protons in said drilling fluid and said earth formation, measuring the intensities of at least the two components, $A_f$ and $A_d$, of the induced signal due to said two different fluids, and recording $P_f$ in accordance with the formula, $$P_f = \frac{A_f}{C - \frac{A_d}{P_d}}$$

as a direct measure of the specific liquid content or porosity of said formation.

4. The method in accordance with claim 3 wherein the step of calibrating said electrical coil includes immersing said coil in a sample volume of pure water, similar in volume and shape to said sample volume of said drilling fluid, and then measuring the initially induced nuclear precession signal intensity.

5. A method of measuring the liquid content or porosity of an earth formation traversed by a borehole containing a drilling fluid including the steps of inducing a magnetic field in an enlarged volume of the drilling fluid, interrupting said field to permit free precession of the responsive protons in the drilling fluid under a relaxation field condition, measuring the initial amplitude, $A_d$ (std.), of the nuclear magnetism signal from said responsive protons precessing in unison as a measure of the density of the responsive protons in the drilling fluid alone, $P_d$, then inducing a magnetic field in said borehole containing said drilling fluid adjacent an earth formation whose density of responsive protons, $P_f$, is to be measured, interrupting said field to permit free precession of the responsive protons in both the drilling fluid and said formation under a relaxation field condition, detecting the total signal amplitude from responsive protons in both said fluid and said formation, separately measuring the initial amplitudes, $A_d$ and $A_f$, of the components of the total signal that independently represent the effects of protons in the drilling fluid and protons in fluids within said earth formation, and recording the density of responsive protons in liquid in said formation alone, as a direct indication of the liquid content or porosity of said formation in accordance with the formula $$P_f = \frac{A_f}{C - \frac{A_d}{P_d}}$$

wherein C is a constant for the induced magnetic fields.

References Cited in the file of this patent
UNITED STATES PATENTS
2,799,823    Shaw et al. _____ July 16, 1957

OTHER REFERENCES

Shaw et al.: Journal of Association of Official Agricultural Chemists, vol. 36, No. 4, Nov. 15, 1953, pp. 1070–1076.